(No Model.)
J. JAMES.
WAGON TOP.
No. 450,158. Patented Apr. 14, 1891.
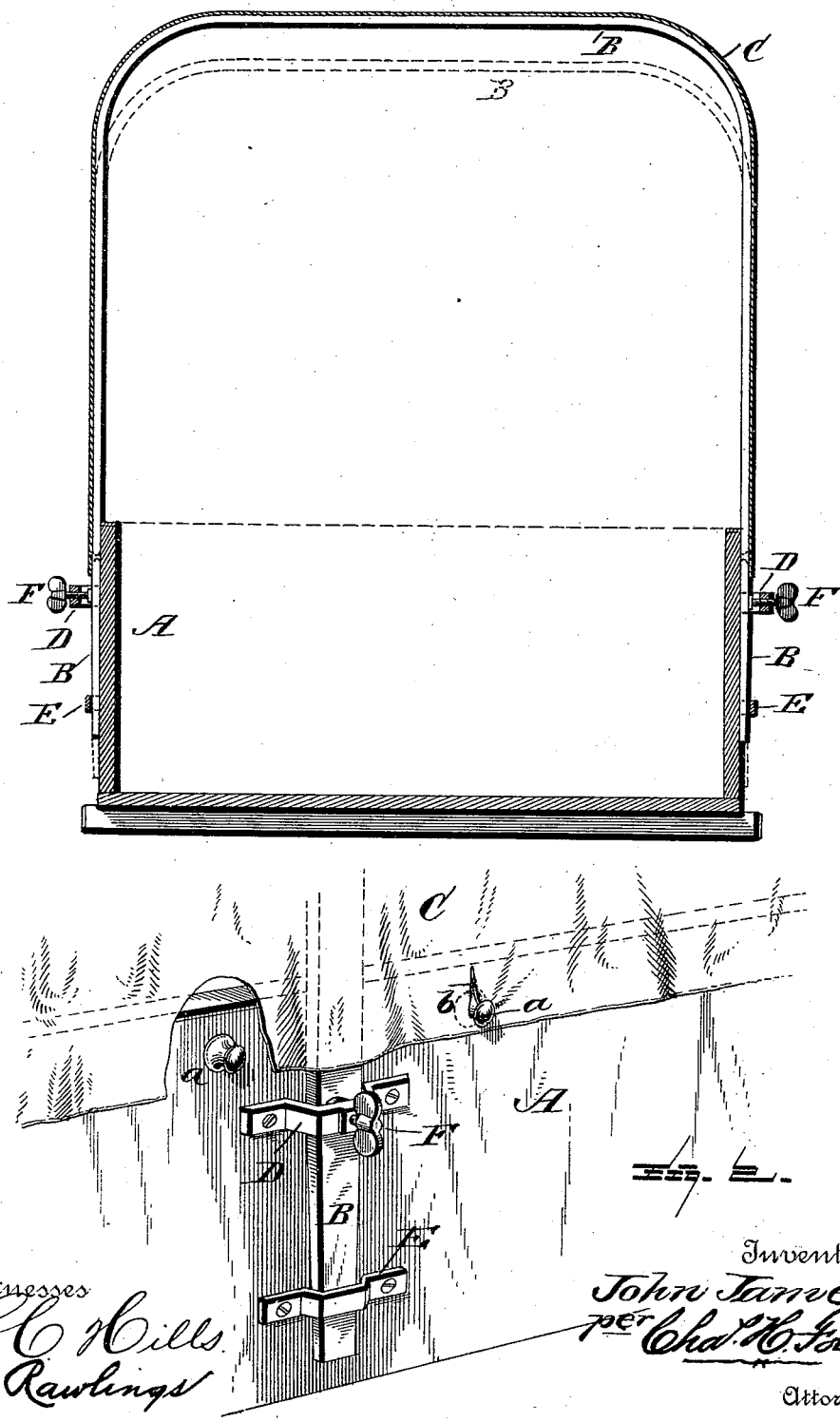
Witnesses
L. C. Hills
A. C. Rawlings
Inventor
John James.
per Chas. H. Fowler
Attorney

UNITED STATES PATENT OFFICE.

JOHN JAMES, OF ALVORD, TEXAS.

WAGON-TOP.

SPECIFICATION forming part of Letters Patent No. 450,158, dated April 14, 1891.

Application filed November 29, 1890. Serial No. 372,990. (No model.)

*To all whom it may concern:*

Be it known that I, JOHN JAMES, a citizen of the United States, residing at Alvord, in the county of Wise and State of Texas, have invented certain new and useful Improvements in Wagon-Bodies; and I do hereby declare that the following is a full, clear, and exact description of the same, reference being had to the annexed drawings, making a part of this specification, and to the letters of reference marked thereon.

Figure 1 of the drawings represents a sectional end view of a vehicle body and top embodying my invention; Fig. 2, a detail view in perspective and on an enlarged scale.

The present invention has for its object to provide a simple and effective means for tightening the canvas covering over the bows of wagon or other vehicle-bodies which form the top thereof; and it consists in the details of construction, substantially as shown in the drawings, and hereinafter described and claimed.

In the accompanying drawings, A represents the body of a wagon or other vehicle, to which are connected the usual bows B and canvas covering C. Instead of attaching the covering C directly to the bows B, it is removably secured to the sides of the body A by means of suitable buttons *a* or other like fastenings engaging with button-holes *b* in the covering, as shown in Fig. 2 of the drawings. Any well-known and desirable means, however, may be employed for connecting the covering to the body of the vehicle; but the means shown I deem the most preferable.

The bows B are connected to the sides of the body A, so that they will admit of vertical adjustment, the ends of the bows passing down between suitable staples D E and the side of the body and held thereto by set-screw F, of any of the well-known forms that will adapt itself to the use for which it is intended, the threads of the screw engaging with a screw-threaded hole in the staple. If preferred, both the staples may be provided with set-screws, although one is considered sufficient, and that connected to the upper one of said staples, as shown in Fig. 2 of the drawings.

When the canvas covering becomes slack, it is readily tightened by loosening the set-screws and forcing up the bows sufficiently to draw the covering tightly over them, thus taking up any slack in said covering. After the bows are forced up the required distance, which may be done by hand or by a tool suitably constructed for the purpose, they are held in their adjusted position by tightening the set-screw against it upon both sides of the body, thus keeping the covering drawn tightly over the bows at all times with comparative little trouble and rendering the appearance of the top much more desirable.

Having now fully described my invention, what I claim as new, and desire to secure by Letters Patent, is—

1. In a wagon or other vehicle body, the combination, with the canvas covering secured to the sides thereof, of vertically-adjustable bows unattached to the covering and adapted to move independent thereof, whereby any slack in said covering may be taken up by moving the bows vertically, substantially as and for the purpose set forth.

2. The combination, with the body of a wagon or other vehicle provided with staples upon its sides and set-screws connected to said staples, of the canvas covering connected to the sides of the body and suitable bows engaging with the staples and held in their adjusted position by set-screws connected to said staples, substantially as and for the purpose described.

In testimony that I claim the above I have hereunto subscribed my name in the presence of two witnesses.

JOHN JAMES.

Witnesses:
A. G. LESLIE,
J. P. STALCUP.